United States Patent
Antchak et al.

(10) Patent No.: US 8,002,657 B2
(45) Date of Patent: Aug. 23, 2011

(54) LOW PROFILE TENSIONER WITH ARCUATE SPRING

(75) Inventors: John R. Antchak, Aurora (CA); James W. Dell, Newmarket (CA); Hubertus G. Mevissen, Schomberg (CA)

(73) Assignee: Litens Automotive Partnership, Woodbridge (CA)

( * ) Notice: Subject to any disclaimer, the term of this patent is extended or adjusted under 35 U.S.C. 154(b) by 19 days.

(21) Appl. No.: 12/065,282

(22) PCT Filed: Aug. 30, 2006

(86) PCT No.: PCT/CA2006/001418
§ 371 (c)(1),
(2), (4) Date: Feb. 29, 2008

(87) PCT Pub. No.: WO2007/025374
PCT Pub. Date: Mar. 8, 2007

(65) Prior Publication Data
US 2008/0220919 A1 Sep. 11, 2008

(51) Int. Cl.
*F16H 7/12* (2006.01)
*F16H 7/22* (2006.01)
*F16H 7/06* (2006.01)
*F16H 7/14* (2006.01)

(52) U.S. Cl. ........ 474/133; 474/135; 474/109; 474/112; 474/113; 474/101

(58) Field of Classification Search .................. 474/133, 474/135, 109, 112, 113, 101
See application file for complete search history.

(56) References Cited

U.S. PATENT DOCUMENTS

| | | | |
|---|---|---|---|
| 1,557,486 A | 10/1925 | Valentine | |
| 1,670,914 A | 5/1928 | Tessky | |
| RE30,842 E * | 1/1982 | Speer | 474/135 |
| 4,351,636 A * | 9/1982 | Hager | 474/135 |
| 4,571,223 A * | 2/1986 | Molloy | 474/133 |
| 4,687,049 A * | 8/1987 | Golben | 165/104.12 |
| 4,698,049 A * | 10/1987 | Bytzek et al. | 474/135 |
| 4,721,495 A | 1/1988 | Kan et al. | |
| 4,822,322 A | 4/1989 | Martin | |
| 4,826,471 A | 5/1989 | Ushio | |
| 4,834,694 A | 5/1989 | Martin | |
| 4,983,145 A | 1/1991 | Hirai et al. | |
| 5,045,029 A | 9/1991 | Dec et al. | |
| 5,045,031 A | 9/1991 | Thomey | |
| 5,083,983 A | 1/1992 | Hirai et al. | |
| 5,277,666 A | 1/1994 | Kumm | |
| 5,342,249 A | 8/1994 | Gardner et al. | |
| 5,348,514 A | 9/1994 | Foley | |
| 5,377,796 A * | 1/1995 | Friedmann et al. | 192/3.29 |

(Continued)

FOREIGN PATENT DOCUMENTS

CA 1184828 4/1985
(Continued)

*Primary Examiner* — Michael R Mansen
*Assistant Examiner* — Henry Liu (57) ABSTRACT

A tensioner operable to substantially maintain a specified tension in a flexible drive, such as a belt or chain, includes a spring, mounted laterally to the pivot shaft of the tensioner, which biases the tensioner arm towards the flexible drive. The spring is arcuate in shape and is maintained in a correspondingly arc-shaped spring retainer on a mounting plate of the tensioner. The arcuate shape of the spring and spring guide on the tensioner arm follows as the tensioner arm pivots towards and away from the flexible drive. The tensioner also has a wear take up mechanism to maintain the friction bushing in continuous engagement with the tensioner arm.

17 Claims, 6 Drawing Sheets

U.S. PATENT DOCUMENTS

| | | | |
|---|---|---|---|
| 5,620,385 A * | 4/1997 | Cascionale et al. | 474/112 |
| 5,772,549 A * | 6/1998 | Berndt et al. | 474/135 |
| 5,795,257 A | 8/1998 | Giese et al. | |
| 5,967,919 A | 10/1999 | Bakker | |
| 6,004,235 A * | 12/1999 | Ohta et al. | 474/109 |
| 6,196,941 B1 | 3/2001 | Ohta et al. | |
| 6,206,797 B1 | 3/2001 | Quintus | |
| 6,264,578 B1 * | 7/2001 | Ayukawa | 474/135 |
| 6,416,435 B1 | 7/2002 | Szatkowski et al. | |
| 6,422,962 B1 | 7/2002 | Lehtovaara et al. | |
| 6,575,860 B2 | 6/2003 | Dutil | |
| 6,682,452 B2 | 1/2004 | Quintus | |
| 6,857,979 B2 | 2/2005 | MacNaughton et al. | |
| 7,186,196 B2 | 3/2007 | Quintus | |
| 2004/0014542 A1 | 1/2004 | Quintus | |
| 2004/0227400 A1 * | 11/2004 | Kraus et al. | 305/143 |
| 2005/0043130 A1 | 2/2005 | Hao et al. | |
| 2006/0172837 A1 | 8/2006 | Quintus et al. | |

FOREIGN PATENT DOCUMENTS

| | | |
|---|---|---|
| CA | 1273510 | 9/1990 |
| CA | 2469497 | 6/2003 |
| CA | 2535108 | 3/2005 |
| DE | 4125494 C1 | 11/1992 |
| DE | 102004015770 A1 | 10/2005 |
| EP | 00361899 A1 | 4/1990 |
| EP | 00364277 A1 | 4/1990 |
| EP | 00425246 A1 | 5/1991 |
| EP | 00536809 A1 | 4/1993 |
| EP | 0709595 A | 5/1996 |
| EP | 0857890 A | 8/1998 |

* cited by examiner

LOW PROFILE TENSIONER WITH ARCUATE SPRING

FIELD OF THE INVENTION

The present invention relates to a tensioner which operates to substantially maintain a specified tension in a flexible drive, such as a belt or chain. More specifically, the present invention relates to such a tensioner with a reduced profile.

BACKGROUND OF THE INVENTION

Tensioners for flexible drives, such as accessory serpentine belts on automotive engines are well known. Such tensioners typically include a pulley, roller or other member, which is biased against the flexible drive by a spring or other biasing means. The pulley is mounted, via a bearing, to an arm which pivots with respect to the tensioner housing. The housing contains the spring or other biasing means which biases the arm towards the flexible drive to maintain a substantially constant tension in the flexible drive. Tensioners can also include frictional members which ride on one another as the tensioner arm moves to provide a dampening force to the tensioner.

While such prior art tensioners are widely employed, they do suffer from some disadvantages. In particular, due to the relatively large forces which must be carried by the tensioner arm, the spring, or other biasing means, and/or frictional dampening members must be sized to be relatively robust and the resulting large size (i.e.—the "packaging volume") of the tensioner increases the height (the distance between the mounting plate of the tensioner and the mid point width of the pulley or roller) of the tensioner.

While in some circumstances the relatively large height of the tensioner is not a problem, in many other circumstances it is a factor as the volume of the engine compartment in which the engine and tensioner are to be located can be quite small. In the past, this issue has resulted in the tensioner being located in a less than ideal position on the engine and/or the tensioner components being downsized, to occupy less volume, at the cost of reduced robustness.

It is desired to have a tensioner which has the desired dampening characteristics and robustness while requiring less height for mounting.

SUMMARY OF THE INVENTION

It is an object of die present invention to provide a novel tensioner for flexible drives which obviates or mitigates at least one disadvantage of the prior art.

According to a first aspect of the present invention, there is provided a tensioner to tension a flexible drive, comprising: a mounting plate; a pivot shaft extending from the mounting plate; a pivot bushing having an outer frustoconical surface and an inner surface complementary to the shape of the pivot shaft, the pivot bushing receiving the shaft in its inner surface; a tensioner arm having a pivot surface complementary to and engaging the outer frustoconical surface of the bushing to allowing the tensioner arm to pivot about a central axis of the pivot shaft, the tensioner arm further having an attachment point for a rotatable member to engage a flexible drive, the attachment point being spaced from the pivot surface; a wear take up mechanism to bias the bushing towards the pivot surface to compensate for wear of the pivot bushing and/or pivot surface; and a spring acting between the mounting plate spindle and the tensioner arm to bias the tensioner arm to a first pivotal position about the pivot shaft, the spring having an arcuate shape corresponding to the path followed by a spring guide on the tensioner arm as the tensioner arm pivots about the pivot shaft.

The present invention provides a tensioner operable to substantially maintain a specified tension in a flexible drive, such as a belt or chain. The tensioner includes a spring, mounted laterally to the pivot shaft of the tensioner, which biases the tensioner arm towards the flexible drive. The spring is arcuate in shape and is maintained in a correspondingly arc-shaped spring retainer on a mounting plate of the tensioner. The arcuate shape of the spring and the spring retainer corresponds to the path that a spring guide on the tensioner arm follows as the tensioner arm pivots towards and away from the flexible drive.

The present invention also provides a tensioner having a wear take up mechanism that maintains a bushing that provides dampening in continuous contact with the tensioner arm as the bushing wears.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
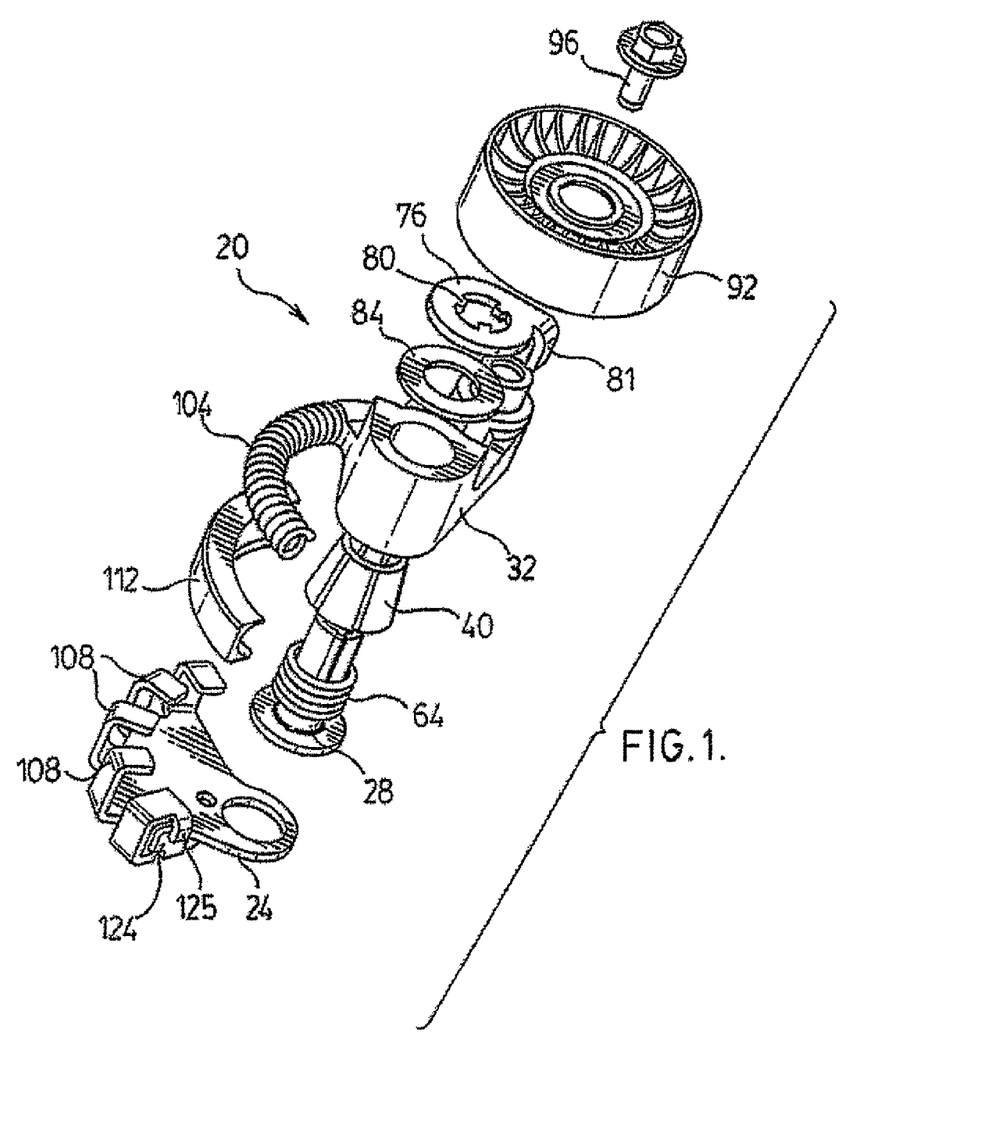
FIG. 1 shows an exploded perspective view of the front and a side of a tensioner in accordance with the present invention.
Figure 2:
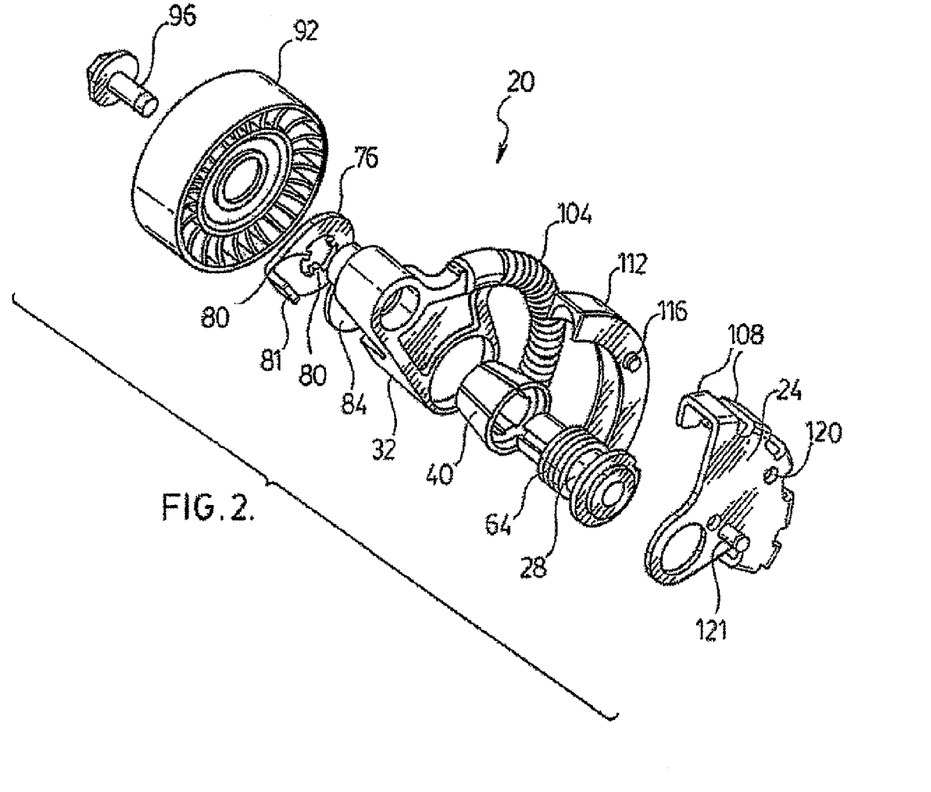
FIG. 2 shows an exploded perspective view of the back and opposite side of a tensioner of FIG. 1.

A tensioner for tensioning belts or chains, in accordance with the present invention, is indicated generally at 20 in FIGS. 1 and 2. Tensioner 20 comprises a mounting plate 24, best seen in FIG. 3, to which a pivot shaft 28, best seen in FIG. 4, is rigidly mounted, preferably staked together.

Figure 5:
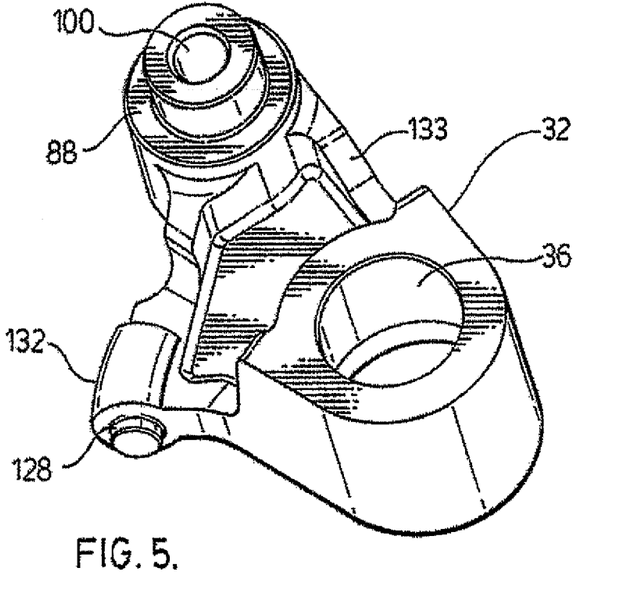
FIG. 5 shows a perspective view of a tensioner arm employed with the tensioner of FIG. 1.
Figure 6:
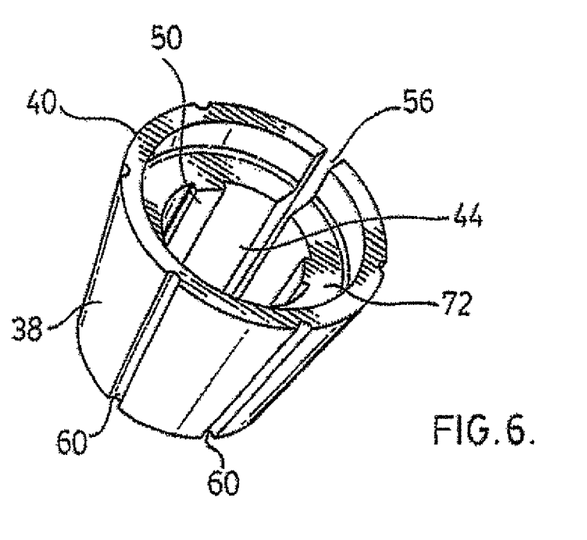
FIG. 6 a perspective view of a pivot bushing employed with the tensioner of FIG. 1.

A tensioner arm 32, best seen in FIG. 5, includes a generally frustoconical inner pivot surface 36, which is substantially complementary in shape to the outer surface 38 of a pivot bushing 40, best seen in FIG. 6.

Pivot bushing 40 further includes a generally cylindrical center passage 44 which is sized to engage the outer surface 48 of pivot shaft 28 and one or more tabs or splines 50 are provided to engage complementary slots 52 in pivot shaft 28 to prevent pivot bushing 40 from rotating on pivot shaft 28 while permitting pivot bushing 40 to move axially along pivot shaft 28.

Pivot bushing 40 is preferably made from a material such as Delrin™, or other reasonably hard nylon, which allows pivot surface 36 of tensioner arm 32 to pivot about outer surface 38 of pivot bushing 40 as tensioner 20 operates, without undue wear of either pivot surface 36 or outer surface 38 occurring.

As is also shown in FIG. 6, bushing 40 is preferably fabricated with a break 56, in the form of an open slot, which provides some accommodation for manufacturing tolerances of pivot shaft 28, pivot bushing 40 and/or pivot surface 36, and at least one debris groove 60 is also provided on outer surface 38. Debris grooves 60 capture water and/or foreign materials entrapped between pivot surface 36 and outer surface 38 and allow the debris to travel along grooves 60 and exit tensioner 20 to reduce wear of the respective surfaces from entrapped debris.

As will be apparent to those of skill in the art, despite the appropriate selection of a material to fabricate pivot bushing 40 and the provision of debris grooves 60, outer surface 38 of bushing 40 will eventually wear under normal use. Accordingly, in the present invention, as wear of outer surface 38 occurs, bushing 40 is urged along pivot shaft 28 towards pivot surface 36 by a wear take up mechanism and this results in outer surface 38 being maintained in fall contact with pivot surface 36 despite wear of outer surface 38.

In the embodiment of the present invention illustrated in the attached Figures, the wear take up mechanism comprises a compression spring 64 which is located coaxially about pivot shaft 28 and which acts between the inner surface of a flange 68 on pivot shaft 28 and a bottom lip 72 of pivot bushing 40, the biasing force of spring 64 biasing outer surface 38 of pivot bushing 40 into contact with pivot surface 36 of tensioner arm 32.

As will now be apparent, by biasing bushing 40 toward tensioner arm 32, outer surface 38 of bushing 40 is maintained in contact with pivot surface 36, despite wear of bushing 40 which may occur in normal use of tensioner 20. By maintaining outer surface 38 in contact with pivot surface 36, off-axis movement (i.e.—tilt) of tensioner arm 32 is minimized or prevented. While in the illustrated embodiment bottom lip 72 of pivot bushing 40 is shown as being flat, the present invention is not so limited. It is contemplated that bottom lip 72 can be an inclined plane, with respect to flange 68, and oriented such that compression spring 64 is compressed to a greater extent (and thus creates a greater force) on one side of bushing 40 to at least partially offset the off-axis forces created by the load exerted by the flexible drive on tensioner arm 32. By at least partially offsetting such off-axis forces, it is contemplated that tensioner arm will be better aligned during the lifetime of tensioner 20.

As is understood by those of skill in the art, the friction between outer surface 38 of bushing 40 and pivot surface 36 acts as a dampening force to reduce oscillations of tensioner arm 32 during operation of tensioner 20. By biasing bushing 40 toward tensioner arm 32 to maintain contact of outer surface 38 with inner pivot surface 36, the dampening force created therebetween is substantially constant, despite normal wear of bushing 40. Further, changes in the dampening force between tensioner arm 32 and pivot shaft 28 and/or changes to the alignment of tensioner arm 32 and pivot shaft 28 which may otherwise occur due to thermal expansion of components of tensioner 20 are mitigated by the above described movement of bushing 40 along pivot shaft 28, towards and/or away from pivot surface 36.

It is important for proper operation of flexible drive means, such as accessory serpentine belt drive on automobiles, that the tensioner provides adequate dampening to the flexible drive. However, it is contemplated that it can be advantageous to have the ability to vary the amount of dampening for different operating conditions. Accordingly, it is contemplated that compression spring 64 of the wear take up mechanism of the present invention can be replaced by, or used in conjunction with, a controllable actuator, such as an electric solenoid or a pressure actuator, such as a hydraulic actuator 164 supplied with pressurized engine lubricating oil (See FIG. 8). In such a case the amount of dampening produced by the frictional force between bushing 40 and tensioner arm 32 can be varied by altering the biasing force applied to bushing 40 by the wear take up mechanism. When high mounts of dampening a required, increased biasing force can be applied to bushing 40 to increase the frictional force developed between outer surface 38 and pivot surface 36. When lower amounts of dampening are required, a reduced biasing force can be applied to bushing 40 to decease the frictional force developed between outer surface 38 and pivot surface 36. However, in either circumstance, it is contemplated that sufficient biasing force will always be applied to bushing 40 to compensate for wear.

As will be apparent to those of skill in the art, the amount of dampening created by pivot bushing 40 and compression spring 64 can be adjusted to suit the particular requirements of an application by modifying the spring force created by compression spring 64, changing the angle of the interface between the faces of pivot surface 36 and outer surface 38, changing the diameter of bushing 40 to increase or decrease surface area, etc.

Tensioner arm 32 is retained on pivot shaft 28 and pivot bushing 40 by a front plate 76 which includes one or more tabs 80 that are shaped to engage complementary slots 82 at the end of pivot shaft 28 during assembly of tensioner 20 to affix front plate 76 in place. Front plate 76 has an axially extending tab 81 that acts as a stop limiting rotation of the tensioner arm 32 relative to the mounting plate 24 under the bias of spring 104. Tab 81 will abut against wall 133 of tensioner arm 32.

A thrust washer 84 is located between front plate 84 and tensioner arm 32 to allow tensioner arm 32 to pivot on bushing 40 and to assist tensioner arm 32 in resisting off-axis forces.

As best seen in FIG. 5, tensioner arm 32 further includes a bearing mount surface 88 to receive a bearing of a rotatable member, such as a pulley, sprocket or roller, to engage the flexible drive. In the illustrated embodiment of the present invention, the rotatable member of tensioner 20 is a pulley 92, best seen in FIGS. 1 and 2, to engage a flexible drive belt (not shown) an pulley 92 includes an integrally formed roller bearing that is received on bearing mount surface 88. Pulley 92 is retained on tensioner arm 32 by a bolt 96, which engages (and/or cuts) a set of complementary internal threads in a bore 100 center in bearing mount 88. The roller bearing allows pulley 92 to rotate freely with the flexible drive.

To tension the flexible drive means, tensioner arm 32 is biased towards the flexible drive means by an arc-shaped (arcuate) spring 104 which acts between mounting plate 24 and tensioner arm 32. Specifically, mounting plate 24 includes a series of fingers 108 into which a spring retainer 112 is placed. Spring retainer 112 is preferably a low friction material, such as Delrin™ or another engineering plastic, and has an outer shape selected to positively engage fingers 108 and an inner shape complementary to the outer surface of spring 104. Spring retainer 112 can also include a boss 116, or another feature, to engage a complementary recess 120, or other complementary feature, on mounting plate 24 to inhibit rotational movement of spring retainer 112 with respect to mounting plate 24.

A pin 121 mounts to the mounting plate 24 and extends therefrom to engage the engine or other fixed surface on which the tensioner 20 is mounted and prevents rotation of the 20 mounting plate 24

Figure 3:
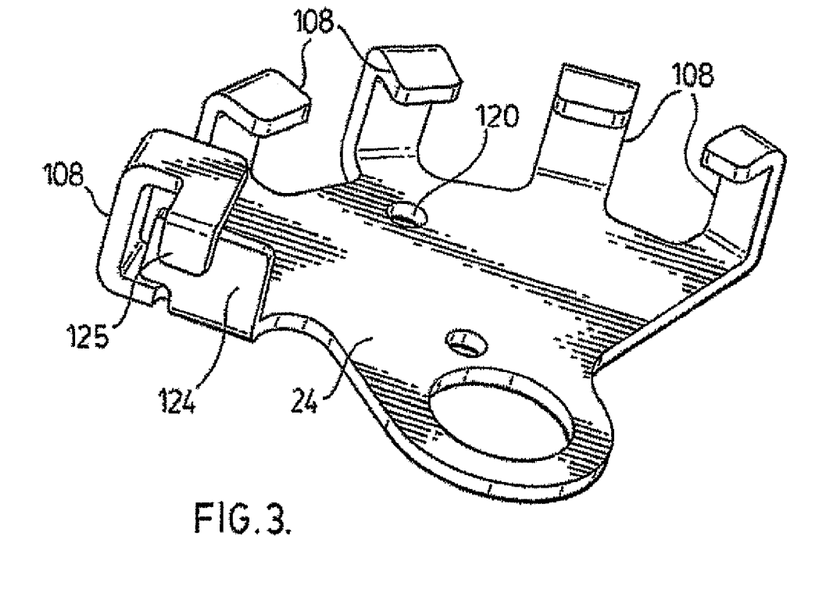
FIG. 3 shows a perspective view of a mounting plate employed with the tensioner of FIG. 1.
Figure 4:
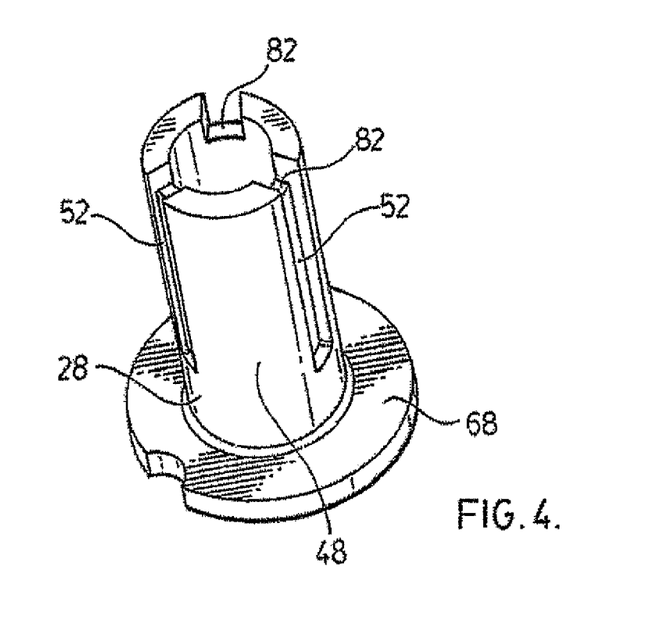
FIG. 4 shows a perspective view of a pivot shaft employed with the tensioner of FIG. 1.

Mounting plate 24 further includes an end stop 124, best seen in FIG. 3, against which one end of spring 104 abuts when spring retainer 112 and spring 104 are assembled with mounting plate 24. Additionally, the end finger 108 may be provided with a tab 125 that engages with the end stop 124 to provide a more rigid stop for spring 104.

The other end of spring 104 engages a complementary spring engagement boss 128, best seen in FIG. 5, on tensioner arm 32. Tensioner arm further includes a sprig guide 132 which is substantially the same cross-sectional size and shape of spring 104. Spring guide 132 rides within the inner shape of spring retainer 112 as tensioner arm pivots about pivot shaft 28 to move pulley 92 towards or away from the flexible drive means. When tensioner 20 is correctly assembled, spring guide 132 travels within the length of spring guide 112, maintaining spring 104 captive therein and providing an additional point of contact between tensioner arm 32 and mounting plate 24 to resist off-axis forces and maintain alignment of tensioner arm 32 during normal operation of tensioner 20.

The arcuate shape of spring 104 and the inner shape of spring retainer 112 are selected such that each radially corresponds to the path along which spring guide 132 travels as tensioner arm 32 pivots about pivot shaft 28.

Figure 7:
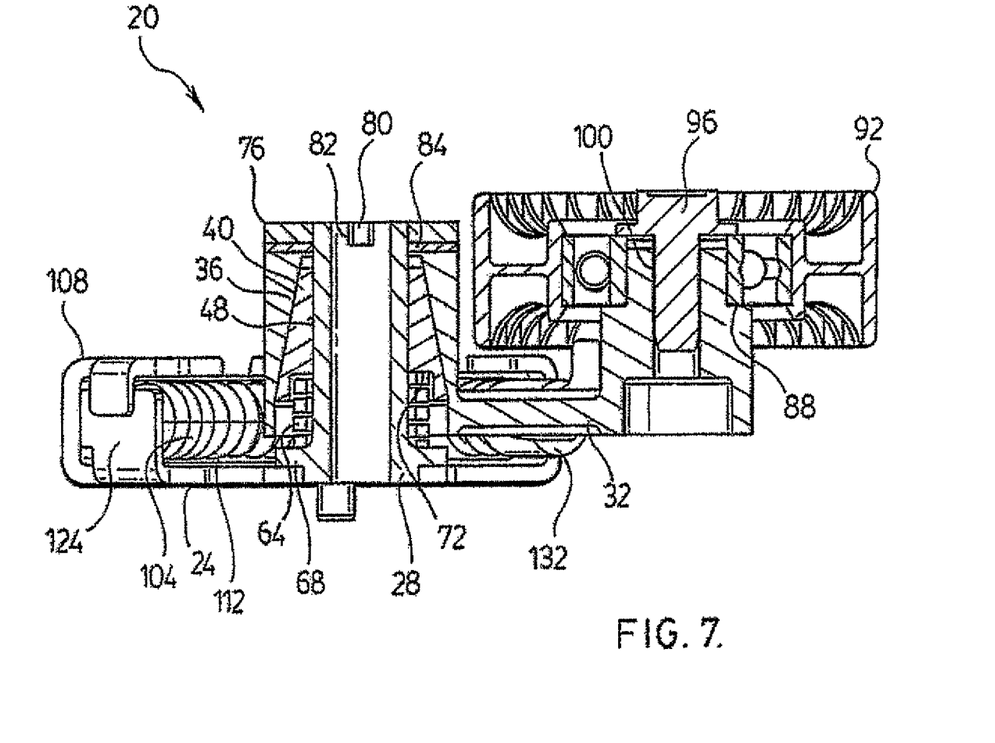
FIG. 7 shows a cross sectional view of the tensioner of FIG. 1.

FIG. 7 shows a cross sectional view of an assembled tensioner 20. As illustrated, by arranging spring 104 laterally from pivot shaft 28 the overall height of tensioner 20 is significantly reduced compared to prior art designs where in the pivot shaft is encircled by an equivalent spring which was helically wound coaxially about the pivot shaft in a manner similar. Prior art designs wherein the spring, which biases the tensioner arm towards the flexible drive, extend laterally from the pivot shaft include: U.S. Pat. No. 5,045,031; U.S. Pat. No. 5,152,721; EP 0 771,969 and WO 02/29281.

However, in each of the prior art tensioners with laterally acting springs, the springs are arranged in a substantially straight manner. In contrast, in the present invention spring 104 is arranged in an arcuate manner and this provides several advantages over straight springs. In particular, by arranging spring 104 in an arcuate arrangement, as described above, spring 104 can be longer than a straight spring which would occupy the same space. Thus, spring 104 can have a longer length with a lower spring force constant to obtain a more linear response over large ranges of movement of tensioner arm 32, than a shorter straight spring which would require a higher spring force constant.

Further, by placing spring 104 in spring retainer 112, the frictional force developed between the exterior of the windings of spring 104 and the inner surface of spring retainer 112 can serve to favorably alter the spring rate developed by spring 104. Specifically, over small movements of tensioner arm 32, such as high frequency oscillations, the friction between the coils of spring 104 and spring retainer 112 tends to result in only a few of the coils of spring 104 adjacent tensioner arm 32 moving, as the movement of those coils absorbs the energy from the tensioner arm, and the remaining coils do not have sufficient energy to overcome the above-mentioned frictional force. This increases the spring force of spring 104 for such small movements of tensioner arm 32.

However, when tensioner arm 32 moves to a larger extent, such as under low frequency oscillations, more of the coils of spring 104 are moved, thus bringing to effect substantially the full length of spring 104 to bias tensioner arm 32 towards the flexible drive means. As will be apparent, such a non-linear spring force where the spring force is greater for small movements and less for large movements is desirable for tensioners. Depending upon the material selected for spring retainer 112 and/or the finish on the exterior of the coils of spring 104, the resulting non-linearity of the spring force of spring 104 can be selected as desired.

The present invention provides a novel tensioner for use with flexible drives, such as serpentine accessory belts on automobiles. The tensioner includes a spring which extends laterally from the pivot shaft, in an arcuate arrangement, to reduce the height required for the tensioner. The spring is held in an arcuate spring retainer against which the spring rubs when the tensioner arm is operating, the friction developed between the spring and the spring retainer being available to alter the effective spring force constant of the spring such that the resulting spring rate is greater during relatively small movements of the tensioner arm and less during relatively larger movements of the tensioner arm.

Figure 8:
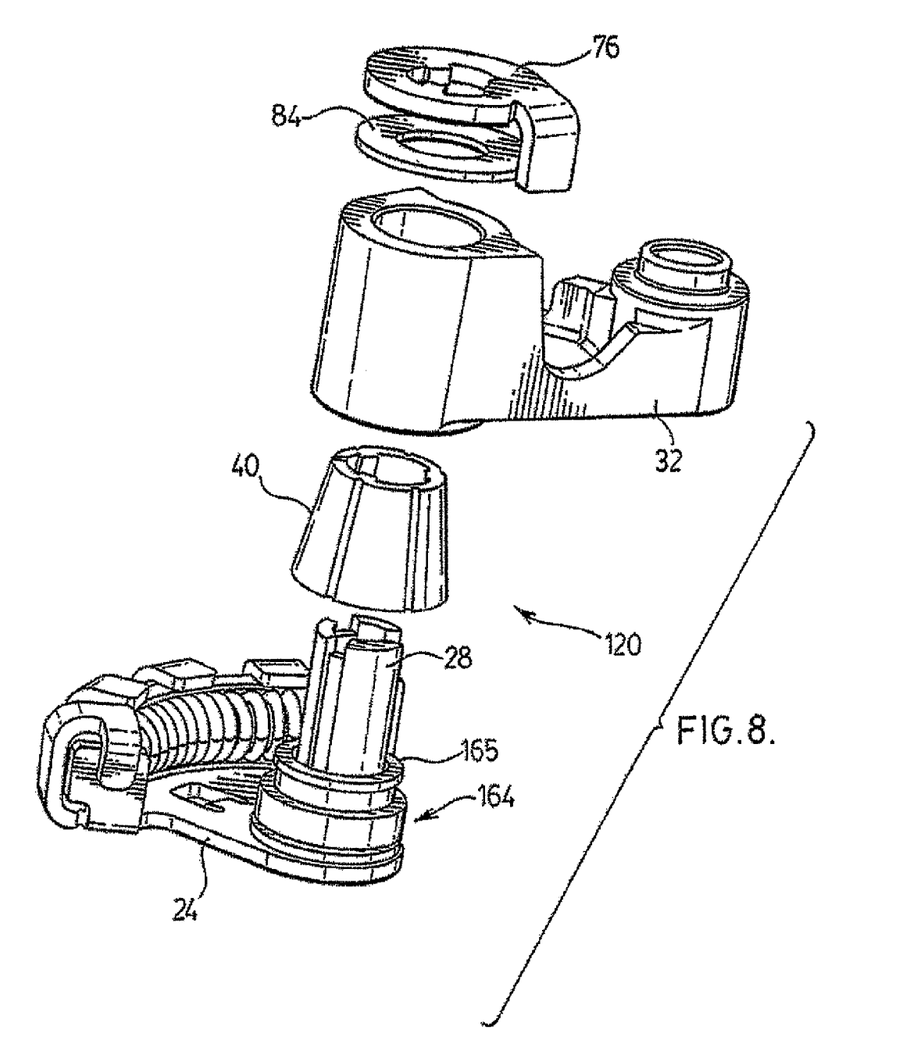
FIG. 8 shows an exploded perspective view of an alternate embodiment of a tensioner of the present invention.

Referring to FIG. 8, a second embodiment of a tensioner 120 according to the present invention is illustrated. Like parts are noted with like parts of the first embodiment. In the second embodiment the take up mechanism is a hydraulic actuator 164 mounted coaxially about the pivot shaft 28. The actuator 164 has a piston 165 that moves axially under hydraulic pressure to engage bushing 40 and urge the bushing 40 into continuous engagement with the tensioner arm 32. As is know to those skilled in the art, the actuator 164 can be hydraulically connected to the hydraulic system of the engine on which the tensioner 120 is mounted or alternatively connected to an independently controlled source of hydraulic fluid under pressure.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A tensioner to tension a flexible drive, comprising:
a mounting plate;
a pivot shaft extending from the mounting plate;
a pivot bushing non-rotatably mounted about the pivot shaft for slidable axial movement, said pivot bushing having an outer frustoconical surface;
a tensioner arm having a pivot surface complementary to and engaging the outer frustoconical surface of the bushing to allow the tensioner arm to pivot about a first axis;
a rotatable member mounted on said tensioner arm rotatable about a second axis, said second axis spaced from and parallel to said first axis;
a spring acting between the mounting plate and the tensioner arm to bias the tensioner arm to urge the rotatable member into tensioning engagement with said flexible drive, wherein said spring has an arcuate shape corresponding to an arcuate path followed by the tensioner arm as the tensioner arm pivots about the first axis;
a spring retainer fixed to the mounting plate, the spring retainer having an inner surface that engages the spring along substantially the entire length of the spring to restrain the spring from bulging outwardly from the arcuate shape when the spring undergoes compressive forces; and
a wear take up mechanism biasing the bushing into engagement with the tensioning arm to compensate for wear between the pivot bushing and pivot surface.

2. The tensioner as set forth in claim 1, wherein said mounting plate has a series of fingers sized to receive and retain said spring retainer and said mounting plate has an end stop positioned to engage an end of said spring.

3. The tensioner as set forth in claim 1, wherein said tensioner arm has an arcuate guide sized to be received along said inner surface and positioned to limit travel of said spring to an arcuate length of said spring retainer.

4. The tensioner as set forth in claim 1, wherein said wear take up mechanism comprises a second spring operatively engaging the bushing.

5. The tensioner as set forth in claim 4, wherein said second spring is a coil spring mounted about said pivot shaft.

6. The tensioner as set forth in claim 5, wherein said bushing and said mounting plate cooperate with said second spring to compress a portion of said second spring at a different extent than a diametrically opposed portion to partially offset off-axis forces generated by the flexible drive on said rotatable member.

7. The tensioner as set forth in claim 6, wherein said bushing has a bottom lip engaging said second spring.

8. The tensioner as set forth in claim 1, wherein said bushing has an open slot.

9. The tensioner as set forth in claim 8, wherein said bushing has at least one groove on said outer frustoconical surface.

10. The tensioner as set forth in claim 9, wherein said bushing has a splined connection with said pivot shaft.

11. The tensioner as set forth in claim 1, wherein said wear take up mechanism is an actuator operatively engaging the bushing.

12. The tensioner as set forth in claim 11, wherein said actuator is hydraulic and said actuator is connectable to a source of pressurized hydraulic fluid.

13. A tensioner to tension a flexible drive, comprising:
a mounting plate;
a pivot shaft extending from the mounting plate;
a pivot bushing mounted about the pivot shaft for slidable axial movement, said pivot bushing having an outer frustoconical surface;
a tensioner arm having a pivot surface complementary to and engaging the outer frustoconical surface of the bushing to allow the tensioner arm to pivot about a first axis;
a rotatable member mounted on said tensioner arm rotatable about a second axis, said second axis spaced from and parallel to said first axis;
a spring acting between the mounting plate and the tensioner arm to bias the tensioner arm to urge the rotatable member into tensioning engagement with said flexible drive wherein said spring has an arcuate shape corresponding to an arcuate path followed by the tensioner arm as the tensioner arm pivots about the first axis; and
a spring retainer fixed to the mounting plate, the spring retainer having an inner surface that engages the spring along substantially the entire length of the spring to restrain the spring from bulging outwardly from the arcuate shape when the spring undergoes compressive forces.

14. The tensioner as set forth in claim 13, wherein said mounting plate has a series of fingers sized to receive and retain said spring retainer and said mounting plate has an end stop positioned to engage an end of said spring.

15. The tensioner as set forth in claim 13, wherein said tensioner arm has an arcuate guide sized to be received along said inner surface and positioned to limit travel of said spring to an arcuate length of said spring retainer.

16. The tensioner as set forth in claim 13, wherein the inner surface of the spring retainer is configured such that during movements of the tensioner arm that are smaller than a selected distance friction between the inner surface of the spring retainer and the spring prevents a first number of spring coils from compressing, and during movements of the tensioner arm that are larger than the selected distance friction between the inner surface of the spring retainer and the spring prevents a second number of spring coils from compressing, wherein the second number is less than the first number, so that the spring constant associated with the spring is higher for tensioner arm movements that are smaller than the selected distance than it is for tensioner arm movements that are larger than the selected distance.

17. A tensioner to tension a flexible drive, comprising:
a mounting plate;
a pivot shaft extending from the mounting plate;
a pivot bushing mounted about the pivot shaft for slidable axial movement, said pivot bushing having an outer frustoconical surface;
a tensioner arm having a pivot surface complementary to and engaging the outer frustoconical surface of the bushing to allow the tensioner arm to pivot about a first axis;
a rotatable member mounted on said tensioner arm rotatable about a second axis, said second axis spaced from and parallel to said first axis;
a spring acting between the mounting plate and the tensioner arm to bias the tensioner arm to urge the rotatable member into tensioning engagement with said flexible drive wherein said spring has an arcuate shape corresponding to an arcuate path followed by the tensioner arm as the tensioner arm pivots about the first axis; and
a spring retainer fixed to the mounting plate, the spring retainer having an inner surface that engages the spring to restrain the spring from bulging outwardly from the arcuate shape when the spring undergoes compressive forces,
wherein the inner surface of the spring retainer is configured such that during movements of the tensioner arm that are smaller than a selected distance friction between the inner surface of the spring retainer and the spring prevents a first number of spring coils from compressing, and during movements of the tensioner arm that are larger than the selected distance friction between the inner surface of the spring retainer and the spring prevents a second number of spring coils from compressing, wherein the second number is less than the first number, so that the spring constant associated with the spring is higher for tensioner arm movements that are smaller than the selected distance than it is for tensioner arm movements that are larger than the selected distance.

* * * * *